H. B. WALLACE.
METHOD OF MAKING TIRES.
APPLICATION FILED NOV. 9, 1916.

1,245,838.

Patented Nov. 6, 1917.
6 SHEETS—SHEET 1.

Inventor:
Harry B. Wallace,
By Hugh N. Wagner
Atty.

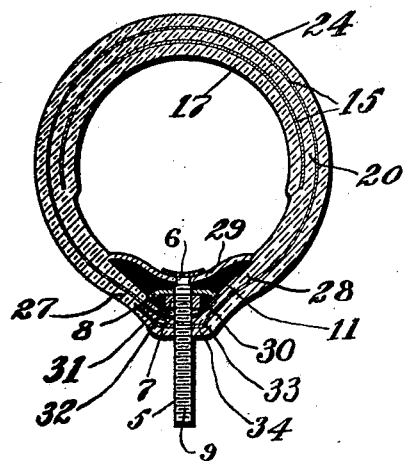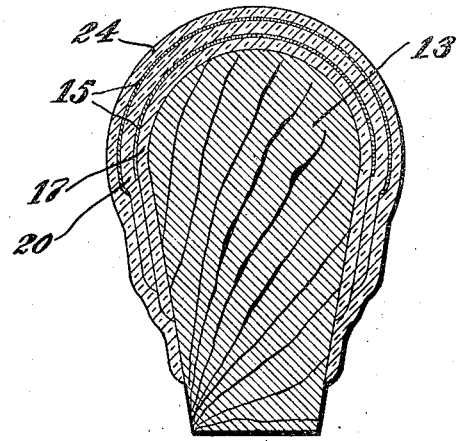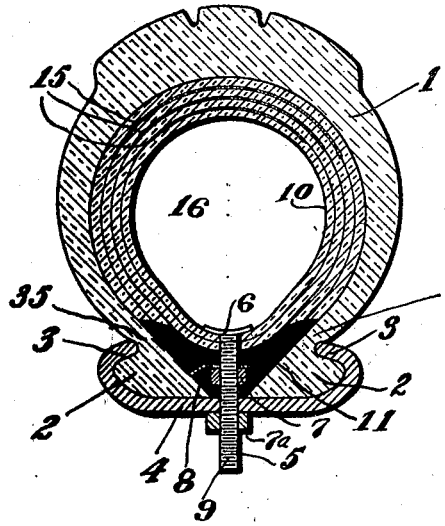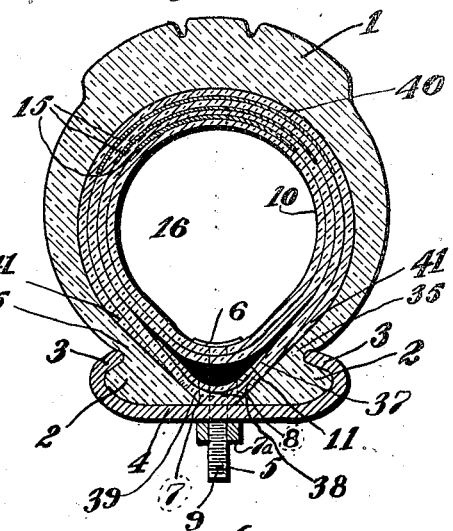

H. B. WALLACE.
METHOD OF MAKING TIRES.
APPLICATION FILED NOV. 9, 1916.

1,245,838.

Patented Nov. 6, 1917.
6 SHEETS—SHEET 3.

Inventor:
Harry B. Wallace
By
Hugh K. Wagner
Atty.

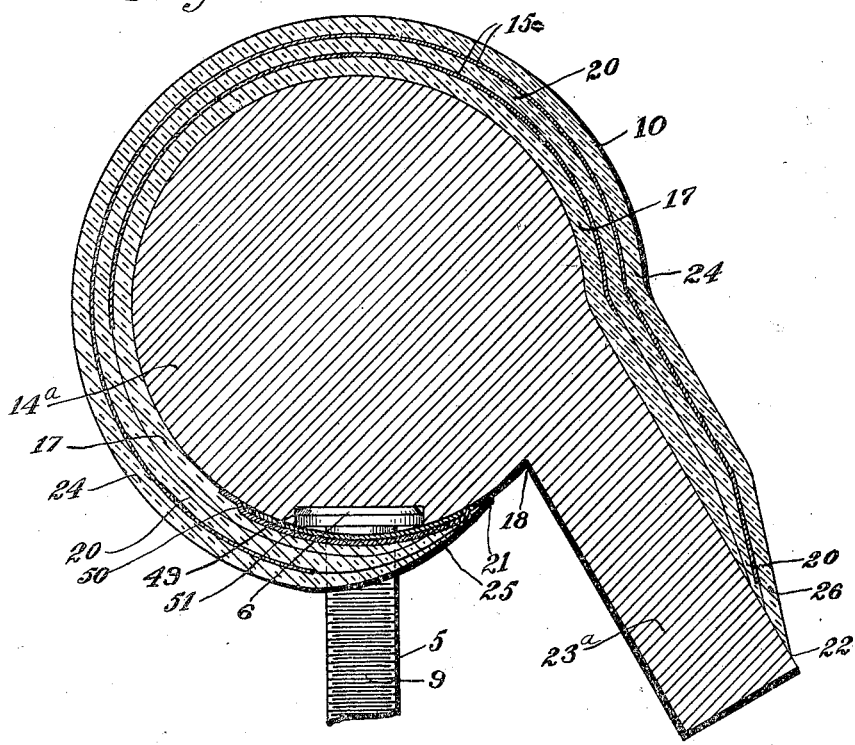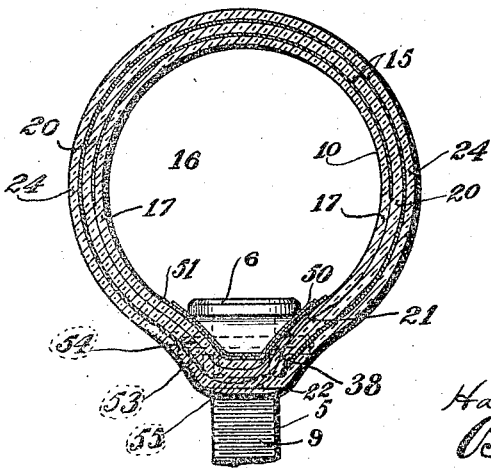

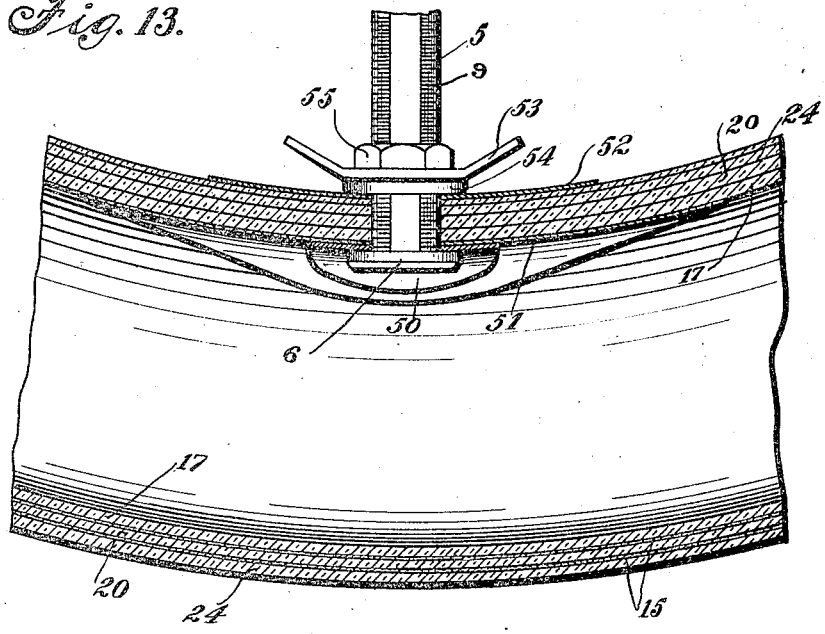
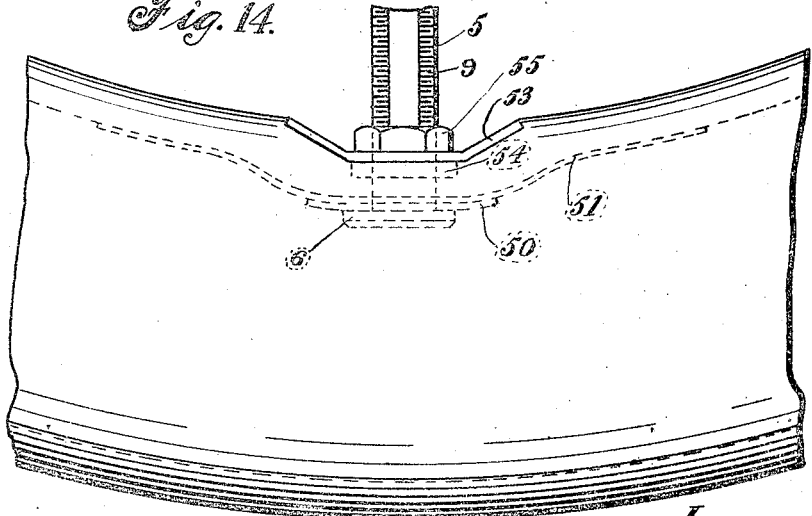

UNITED STATES PATENT OFFICE.

HARRY B. WALLACE, OF ST. LOUIS, MISSOURI.

METHOD OF MAKING TIRES.

1,245,838.   Specification of Letters Patent.   Patented Nov. 6, 1917.

Application filed November 9, 1916. Serial No. 130,445.

*To all whom it may concern:*

Be it known that I, HARRY B. WALLACE, a citizen of the United States, residing at the ctiy of St. Louis, in the State of Missouri, have invented certain new and useful Improvements in Methods of Making Tires, of which the following is a specification.

This application covers process subject matter divided from an application filed by me August 18, 1916, serially numbered 115,638, and is to that extent a continuation thereof, but certain additional matter is, also, herein included.

This invention relates to tires, especially of the kind that are used on automobiles, and to the method of making the same. These tires may be made either as air-tight casings adapted to be used minus the inner air tube now customarily in use or in the form of pneumatic inner tubes adapted to be inclosed in the outer casings now customary or the like. *Mutatis mutandis*, the method of this invention may be used for making any article of similar general construction.

The objects of this invention are, among others, to make the part of the tire or inner tube that is adjacent to the tread of the tire stronger and to that extent puncture proof; so to construct the same as to eliminate "blowouts" from "rim cuts" and, also, to obviate "pinches" of inner tubes; to eliminate the transverse seam customarily found in inner tubes; to facilitate, and therefore cheapen, the process of manufacture; and to produce other advantages that arise from the method of manufacture and inhering in the construction or constructions hereinafter described.

In the accompanying drawings forming part of this specification and in which like numbers of reference denote like parts wherever they occur, Figure 1 is a transverse sectional view illustrating a form of mandrel on which the above-mentioned tires can be formed and in connection with which the hereinafter-described method of manufacture can be practised whether the product is to be an air-tight tire or an inner tube to be inclosed in an outer casing, plies of plastic rubber, textile fabric, or the like, and a ring of relatively harder material being shown thereon in process of making a tire or tube;

Fig. 3 is a transverse sectional view through a tire or tube of the preferred form of this invention;

Fig. 4 is a transverse sectional view illustrating one form of core or mandrel for forming such a tire or tube and having superimposed thereon certain piles of rubber and fabric;

Figure 7:
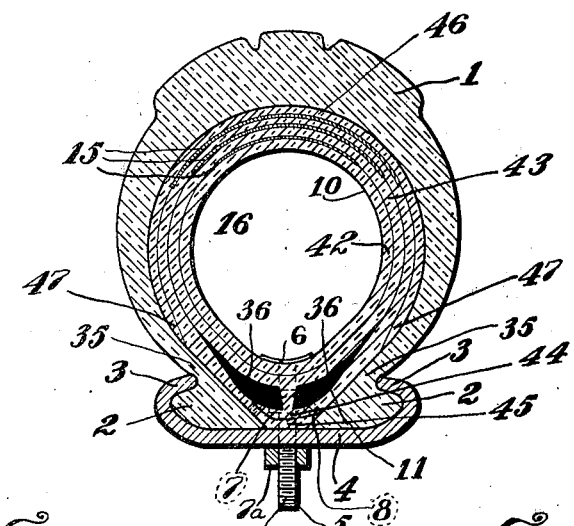
Figure 8:
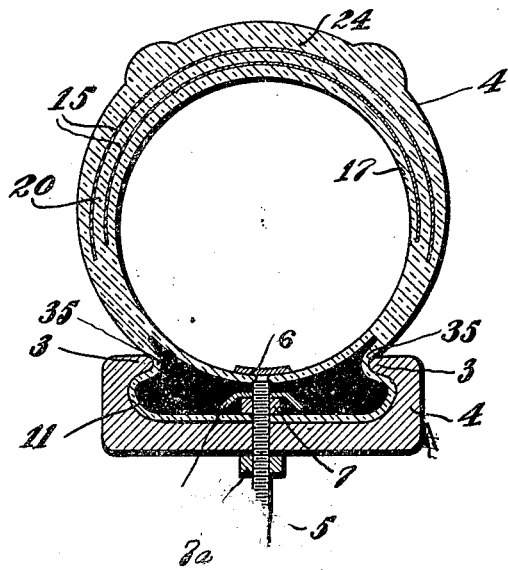
Figure 9:
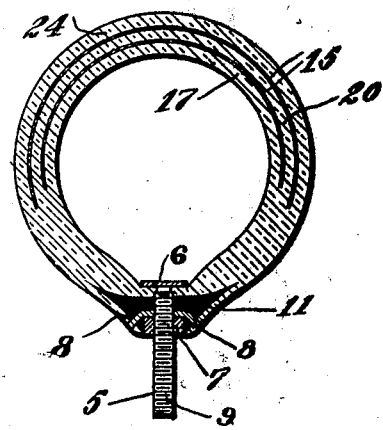
Figure 10:
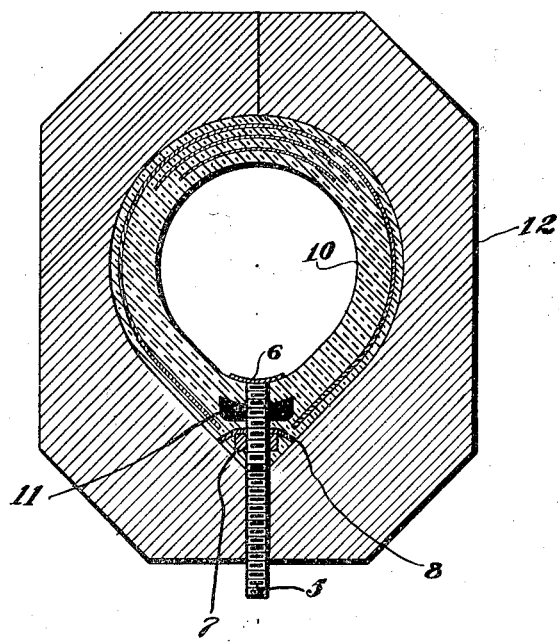

Figs. 5, 6, and 7 are transverse sectional views through a casing of ordinary construction having therein inner tubes constructed according to this invention and inflated in their respective casings, the said inner tube in each case being, also, shown in section and the forms in the said three figures being modifications of the form of tire or tube illustrated in Fig. 3;

Fig. 8 is a transverse sectional view illustrating a complete air-tight casing and tube combined made in accordance with this invention;

Fig. 9 illustrates another modification of Fig. 3;

Fig. 10 is a sectional view illustrating, as viewed from above, an inner tube of this invention contained in the mold in which it is cured;

Fig. 11 shows a modified form of mandrel and the method of making a modified form of product;

Fig. 12 shows the said modified product in transverse section;

Fig. 13 is a longitudinal sectional view of the part of the said product near its valve prior to vulcanization; and Fig. 14 is a side elevation of the same at the same point after vulcanization.

Before describing the method of manufacture or the especially preferred features illustrated in Fig. 3, a general description of the constructions shown in the different figures of the drawings will be given, it being understood that Fig. 8 depicts an airtight casing which does not require the use of an inner tube and, furthermore, that Fig. 3 may be regarded as the illustration either of an air-tight casing that does not require the use of an inner tube or of an inner tube itself adapted to be placed in an outer casing of either ordinary or special construction.

The casing 1 may be an ordinary casing of any ordinary or well known construction, and may be either of clencher, quick detachable clencher, or straight side type, but is shown in the drawings as of the clencher type, having the customary beads 2, which are held by the flanges 3 of the rim 4 of the wheel (not shown).

The valve 5 may be of any ordinary construction, and is held within the inner tube by its flanged head 6 and the nut 7, which bears upon the keeper-plate 8, the said nut 7 rotating upon the threads 9 on the exterior of the valve 5. It is to be understood that the head 6 of the said valve 5 is inserted within the inner tube 10 before the same is vulcanized and drawn down tightly against its wall. The keeper-plate 8 is then slid along the valve 5 until it comes in contact with the ring 11 attached to the inner tube 10 and forming part thereof, and the said head 6 and the said plate 8 are then drawn together by the turning of nut 7 on the threads 9. The inner tube is then placed in the mold 12 for vulcanization, as shown in Fig. 10.

It will be observed from an examination of Figs. 3, 5, 6, 7, and 8, that when the nut 7ª is turned into place on the inside of rim 4, as is customary in attaching tires to wheels, the ring or member 11 will be drawn toward rim 4 in such manner as to cause the same to act as a wedge between the flanges 3 or similar parts, and thus increase the tightness of connection between the tire and the wheel-rim, the said ring or member 11 being of hard or semi-hard material as compared with the more flexible or resilient material outside of, or adjacent to, the same.

Heretofore inner tubes for tires have been formed in longitudinal tubular form on long metal calender rolls or mandrels and later bent into annular form and their ends joined in a transverse seam vulcanized by heat. The said transverse seam has been a point of weakness and a place where leaks resulting in flat tires have often occurred. The said calender rolls bearing the inner tubes have been introduced into the oven in which the tubes have been cured and are out of use for shaping purposes during the process of vulcanization or curing, being used in vulcanization as internal molds. In lieu of the said rolls, air or other fluid under pressure is used in the process of this invention as a form during curing. The molding core or mandrel 13 in Fig. 4 and 14 in Figs. 1 and 2 may be made of wood, because, according to the herein-described process of molding and curing, it is not necessary to introduce the said cores into the curing oven, but one of the advantages of this invention is that it provides for the removal of the molded tube from the molding core or mandrel before introduction into the curing oven (not shown). Metal cores are, moreover, more expensive than those made of wood or similar material. The cores illustrated and described herein may be collapsible, if desired, but need not necessarily be so, and they may be made not alone of wood but of any desired material.

Embedded in the rubber material of the inner tube 10 is a strip or a plurality of strips of fabric of textile or other protective material 15 adapted to stop the entrance of any penetrating point or instrument that may have pierced the casing 1 and begun to pass through the tube 10. These strips may be of any desired width or extension, and, for instance, may extend as in Fig. 3 or as in Figs. 5, 6, 7, 8, 9, 1, or 2. It is, of course, well understood that the air contained within air space 16 inside the inner tube 10 can not escape until a puncture has been made through the entire thickness of tube 10, including the fabric strips 15.

Certain other features of the construction of this invention will be best understood when stated in the following description of the method of manufacture of these tires.

Figure 1:
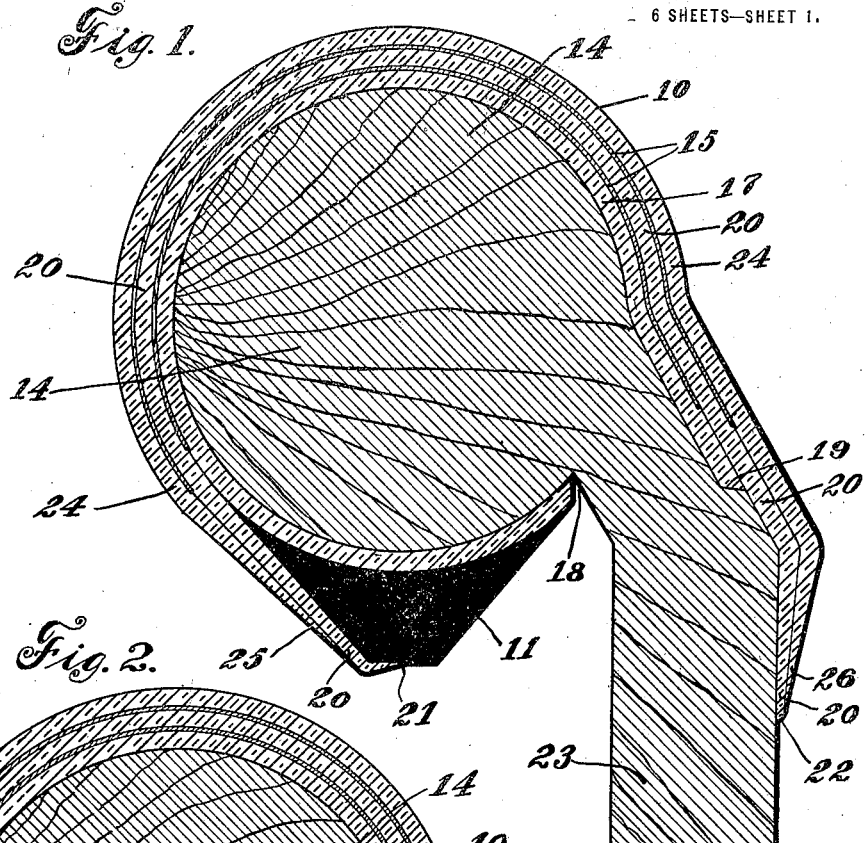
Figure 2:
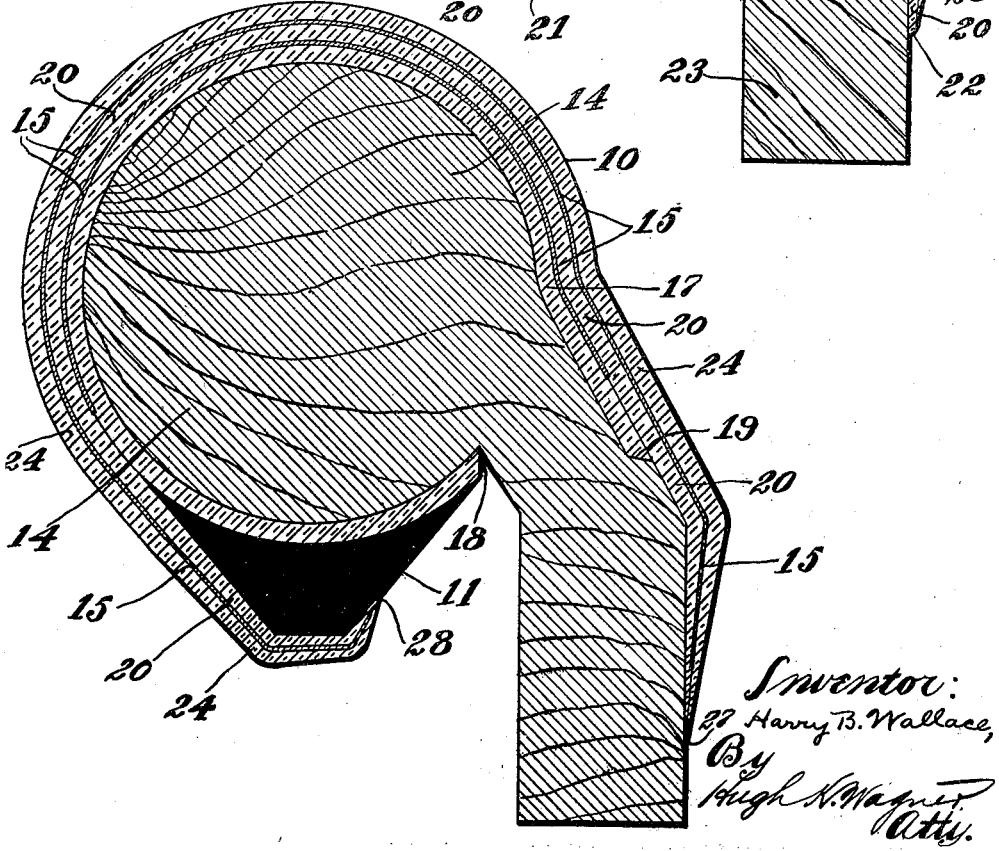
Fig. 2 is a view similar to Fig. 1, but illustrating certain preferred details of manufacture resulting in the preferred form of tire or tube illustrated in Fig. 3.

The method of making the same is substantially the same whether the molding core or mandrel depicted in Figs. 1 and 2 or the other form of molding core depicted in Fig. 4 or any other shape of core is used and whether the product is of the form shown in Fig. 3 or that shown in any of the optional forms. The necessary changes in steps can easily be made according to which form of product is desired, but the method will first be described in connection with Fig. 1.

The mandrel, core, or tire-mold 14 is first placed in position on a tire-mold holder of ordinary construction, which holder is not illustrated in the drawings. Then upon and around the said core 14 annularly and nearly circumferentially a layer 17 of plastic rubber is laid and worked upon the core 14 from the notch 18 all the way around to the shoulder 19. Then at and to each side of the tread part of the tire a layer 15 of fabric is worked upon the said layer of rubber 17 so as to adhere thereto. After this a second ply of plastic rubber 20 is laid upon said fabric ply 15 and worked thereon and from a point located approximately at the point marked 21 all the way around to approximately the point marked 22 upon the flange 23 of core 14, the hard rubber or semi-hard rubber or built-up fabric bead or ring 11 having previously been placed within the core 14 and closely fitting and adhering more or less to the plastic rubber material 17. Following the placing and working of plastic rubber material 20, another ply of fabric 15 is placed thereon and worked thereupon like the fabric layer last mentioned, and then the outer ply of plastic rubber 24 is laid in place and worked upon the ply of fabric 15 underlying the same, being chamfered or tapered near its ends 25 and 26 so as to end in smooth connection with and adhesion to ply 20. In the foregoing description, where rubber or fabric is said to be worked upon an underlying member, it is understood that the same is accomplished by suitable hand or other tools, such as rollers, knives, mallets, pestles, or the like.

After the tire or inner tube has been constructed as hereinbefore described, it is slipped off the core 14 by loosening it at the point 22 (of course, if a collapsible core is used it is simply collapsed), and then that part of the same adjacent to the said point 22 when on the core is brought together with the opposing side, so that the part of the tire that when on the core lies adjacent to the shoulder 19 meets with that part of the tube which when on the core is located at the notch 18, and that part of the tube which when on the core extends from the shoulder 19 to the point marked 22 is caused to adhere to the outside of the ring 11, covering the same all the way from the part which on the core is adjacent to the notch 18 to the point marked 21. A hole (not shown) is formed in ring 11, as indicated in Figs. 3, 5, 6, 7, 8, and 9 (but not shown in Figs. 1 and 2) through which the stem of the valve 5 is inserted, as hereinafter described, and the same protrudes outwardly through the ring 11 and that part of the plastic rubber tube material that extends when on the core from the shoulder 19 to the point marked 22. The said part of the tube, being of plastic rubber, is easily molded around the said valve 5.

The method of forming, in accordance with Fig. 2, the preferred form of tire or tube illustrated in Fig. 3 is substantially the same as that hereinbefore described in connection with Fig. 1, with the differences, however, that the sides of the plastic plies 20 are extended farther on the flange 23 than the point 22, that is to say, to a point 27 (whereby the reach of the said plies is increased), and the adjacent side of the ply 15 is extended between the same adjacent substantially to the same point, while at the opposite side of the said plastic ply 20 and fabric ply 15 their edges are extended approximately to the point 28, which results in greatly strengthening the article produced, and when the opposing edges brought from point 27 to overlap those that terminate at point 28 are caused to adhere together the article has the appearance shown in Fig. 3, in which a plastic ply 29 overlies the ring 11, while another plastic ply 30 underlies the same (both adhering thereto), and a portion of fabric 31 underlies the plastic material 30 and is bound thereto by a layer of plastic material 32, and another ply 33 of fabric underlies the last-mentioned plastic layer and is in turn underlain by a plastic part 34.

After the tube has been formed in the manner hereinbefore described and all the parts thereby caused to adhere more or less to adjoining parts by reason of the adhesiveness of the plastic rubber plies, the tube is placed in a two-piece mold, as depicted in Fig. 10 in sectional view, which mold has a hole between the two sections, enabling the valve 5 to protrude therethrough. Air or other fluid is injected through the said valve, so that the tube is inflated to the full size of the mold or to any other size desired, any suitable closure (not shown) is applied to the mouth of the valve 5, and the mold 12 containing the tube is introduced into the curing oven. By this method of manufacture, it will be observed that the valve stem is vulcanized in its place in the tube at the same time and by the same operation as when the tube is vulcanized, and, furthermore, that no transverse seam occurs in the tire and that none such needs vulcanization. Due to the fact that plastic rubber is pressed upon and worked to adhere to the ring or bead 11 and thereafter the whole is cured by baking, the tube produced as hereinbefore described may properly be described as a seamless tube, because the vulcanization thereof amalgamates all its parts into an integral structure. Moreover, the fact that ply 17 of the rubber overlaps the ring 11, while the plies 20 and 24 underlap the same (the whole being vulcanized into one integral mass), negatives the presence of a seam containing possibilities of leakage.

It should be noted that in Figs. 5, 6, and 7 the inner tube 10 is shown as inflated to approximately a close or tight fit with the inside of the casing 1, but, if desired, a slight air space may be left between the said inner tube and the part of the inside of the casing 1 adjacent to its tread, the same being accomplished merely by the introduction of less air. Due to the fact that the tread side of the tube preferably contains protective strips 15, inflation of the tube will expand first the parts away from the said strips and thus leave such air space opposite the tread.

One of the commonest causes of what are known as "flat tires" is what are called "pinches", and these usually occur in that part of the tube adjacent to the rim; but "pinches" are obviated by the construction of this invention due to the fact that the ring 11 is incapable of being "pinched", while the fabric strips 15 so protect the tread part of the tube as to prevent "pinches" there or anywhere where the said fabric strips 15 extend.

Another common cause of "flat tires" is "rim cuts" on the edges of the casing adjacent to their attachment to their respective rims. When the wall of a casing at a point like 35 (Figs. 3, 5, 6, and 7) becomes thin by the rim cutting therethrough, the pressure from the inside out of the compressed air contained within the inner tube produces a "blow-out" at, for instance, such a point as 35. In the preferred construction of the ring 11, as shown in Figs. 3, 5, 6, 7, 8, and 9, the bead or ring 11 will extend higher than the flanges 3 of the rim 4 and prevent "blow-outs" due to rim-cutting, because there can be no "blow-out" through ring or bead 11.

In Fig. 7 the bead or ring 11 consists of a pair of members 36 of material like that hereinbefore mentioned in connection with ring 11, which members 36 become amalgamated into one in the hereinbefore-described process of vulcanization with the valve 5 in place between and cemented to them.

Figs. 5, 6, and 7 differ from each other in respect to the arrangement of plies of rubber and in the same respect differ more or less from Figs. 1 and 2. In Fig. 5 the plies of rubber are shown as separated by strips of other fabric 15 and as coming to a common point immediately above the ring 11, to which they become welded by vulcanization. In Fig 6 one ply of rubber forms a tube; the next outer ply of rubber underlies the same and rests upon the top of the ring 11 and encircles the first-mentioned tubular ply of rubber and at its other end 37 underlies and underlaps the said ring 11. The next outer ply underlaps the end 37 aforesaid at 38 and encircles all within it and underlies its end 38 at 39. Rubber ply 40 lies outside of all the aforementioned plies, but does not completely encircle the same, its end being chamfered at 41.

In Fig. 7 the inner tube 10 is made of a tubular ply 42, which lies above the ring 11 composed until vulcanization of the two semi-hard rubber members 36. Outside of the plastic rubber ply 42 is another tubular plastic member 43 separated from the ply 42 by a fabric strip 15. Superimposed upon ply 43 is another fabric strip 15, outside of which is a plastic rubber ply that begins at 44 and ends at 45, its said ends 44 and 45 overlapping each other, while the rest of the said ply encircles the plies 42 and 43. Overlying the ply having the ends 44 and 45 is ply 46, which does not encircle the last-mentioned ply, and has chamfered ends 47.

One advantage of forming an inner tube upon an annular core like those herein described and illustrated, rather than upon long calender rolls or mandrels, is that the right amount of material will be spread upon the outer surface of the said core and a lesser amount upon the inner surface of such core and the said material is molded in the right manner in its curvilinear form.

A straight tube that is subsequently bent into annular shape naturally tends to break and crack on the inside of the curve because it has too much material there for its curvature and tends likewise to break and separate on its outer circumference because it has relatively too little material there.

It should be understood that in the forms illustrated in Figs. 1, 2, 3, 5, 6, 7, 8, 9, and 10 the valve 5 is cemented to the tube and within the ring 11 in the process of vulcanization or curing of the tube. In the form shown in Fig. 7 all that is necessary for its location in position is that it shall be inserted between the members 36, while in the form of ring 11 shown in Figs. 1, 2, 3, 5, 6, 8, 9, and 10, in which the said ring is composed of a single member, it is necessary to leave a hole through which it can be passed.

The tube when placed in the mold 12 may be inflated with air or other fluid under pressure, which serves as a form upon which the tire is held while being vulcanized, obviating the use of metal cores as such internal molds.

The foregoing description applies equally to the manufacture of what are known as inner tubes for pneumatic tires and the manufacture of what are known as outer casings and, also, the manufacture of combined tubes and casings such as illustrated in Fig. 8, in which the use of an inner tube is dispensed with, and the tire 48 (built up of plies of plastic rubber in substantially the same manner as described in connection with Figs. 1 and 2) serves the combined function of both inner tube and casing. The tire of Fig. 8 has the ring 11, valve 5 and connected parts, and the alternated plies of rubber and protective fabric hereinbefore described in connection with the other figures of the drawings. The ring 11 shown in Fig. 8, although of somewhat different shape from that of the same member shown in the said other figures, has the same function as in the said other constructions.

One of the main features of the method of making inner tubes herein described is that it permits and provides means for making an inner tube which as made and produced will possess a contour substantially conforming to the interior form or shape, as well as size, of the inside cavity of an ordinary outer casing within which the said tube is to be used, and, furthermore, that the said inner tube manufactured according to this method will be transversely and longitudinally seamless. By reference to Figs. 3 and 9, in which constructions that may be used, as inner tubes are shown disjoined from outer casings, and, furthermore, by comparison of the same with the inner tubes illustrated in Figs. 5, 6, and 7, it will be seen that such inner tubes have a shape in cross-section somewhat resembling the shape of a cross section of a pear and that the same naturally conform to the shape of the cavity within an ordinary outer casing. Comparison of the shape of the mandrel or core 13 in Fig. 4 with the main body portion of the mandrel 14 illustrated in Figs. 1 and 2 will in part show how the herein described method of manufacture may be varied within the scope of this invention, this method not being limited to the use of any particular apparatus.

In Figs. 3, 5, 6, and 7 the plies of plastic rubber from which the tubes are built up in the manner described in connection with Figs. 1 and 2 are indicated, although the process of vulcanization so blends the same together as to make the plies of plastic rubber an integral mass such as better illustrated in Figs. 8, 9, and 10.

It is evident that the herein-described process of manufacturing tires is much cheaper than any heretofore practised, for the following, among other, reasons: Separate vulcanization of a transverse seam is obviated, because in these tires there is no transverse seam; separate vulcanization of the valve into place in the tire is obviated, because that is done simultaneously with the curing of the tire; instead of introducing the shaping cores into the curing molds (thus putting out of use the said cores during the process of curing), the tires are removed from the said cores and they are molded in the curing process upon the natural core of air or other fluid introduced into the same through the valve immediately before being placed in the curing oven; the way of laying and working the plies from which the tire is built up is simpler and more convenient in this method than in others; leaks are obviated by this process and thus no waste tires need to be discarded; and the product produced is superior in quality and serviceability and, therefore, nets a larger result to the manufacturer.

One of the reasons why tires (or tubes) as herein described are more durable than those otherwise constructed is that less pressure is necessary for adequate air inflation thereof. Another reason is that they are better cushioned on the tread.

The inner tubes made in accordance with this invention to be used in other casings can be shaped so as to fit exactly the interior contour of such an outer casing, instead of being made in the tubular form now practised on mandrels or calender rolls. When such a tubular inner tube is placed inside a casing, it assumes the wedge shape of the interior contour of the casing only by reason of the air pressure being so excessive as to force it out of its own tubular shape and so as to assume any shape possible to give it by expansion. The herein-described method of manufacture, however, allows the inner tube to be conformed in manufacture to the shape of the interior contour of a casing (which, as at present practised, is somewhat wedge shape), and the result is that when air inflation takes place it is not necessary to introduce an enormous pressure adequate to force a tubular-shaped inner tube into the shape demarked by the outer casing, but the introduction of slight air-pressure causes the walls of the inner tube of this invention (shaped in manufacture to conform to the inner contour of the casing) to take the shape of the interior contour of the casing, and a very slight additional pressure will impart to the tire all the resiliency necessary. One of the greatest causes of deterioration in tubes and casings is the excessive pressure from within the same caused by air inflation adequate to meet present conditions; but with the inner tubes of this invention half the air pressure commonly applied in other makes is sufficient. For this reason, it has been found in actual practice that a casing of ordinary make having a weak spot or weak spots from cuts or other causes which would result in an immediate "blow-out" if inflated adequately for the insertion of an ordinary inner tube of the kind customarily now in use can not only be used with a tire of the kind herein described shaped to conform to the interior contour of the casing, but will give long augmented service.

It is well known that tires that are highly inflated with air are "hard-riding", while tires with air underinflated, i. e., having a less degree of air-pressure within the same, are "easy-riding". It is, therefore, another advantage of this invention that, while adequately inflated with half the air-pressure properly necessary for other tires, the tires of this invention are "easy-riding", because of the less degree of air-pressure used in properly inflating the same. This is an advantage for any kind of car, but is a particular advantage in ambulances, pleasure cars, and the like. The more gently a car rides the less will be the vibration and consequent deterioration of all parts. It will be observed that in Figs. 3, 5, 6, 7, 8, and 9 of the drawings the inner tube is in each case indicated as having a wedge-shaped form toward the bottom and shaped otherwise corresponding substantially to the interior contour of an ordinary outer casing.

In the manufacture of automobile casings at the present time, two different qualities or structures of textile fabric are used, the same being employed for different purposes. One of these is a close mesh fabric which is used as building fabric, such as employed in the inner parts of an automobile casing, while the outmost ply of textile fabric in an automobile casing consists of what is called "breaker cloth", which is a textile fabric of relatively wide or open mesh. In an automobile casing, the "breaker cloth" is used for the outmost ply of fabric, because it has been found that its open mesh allows it to receive the rough impacts of the road with less damage thereto than if the closer woven interior building fabric were located in its position. In the construction of the herein-described inflatable tires like Fig. 8 or the herein-described inner tubes, the relatively open mesh textile fabric is used for a different purpose, namely, to increase the flexibility of the construction, whereby it has been found in actual practice that an inner tube of the ordinary thirty inches by three and a half inches dimensions expands throughout one-half inch under a pneumatic pressure of about fifty pounds and that such pressure is adequate for the proper use thereof. It is well known that the longevity of a tire is diminished by excessive internal pressure and increased by the use of adequate, but less, pressure. In the use of the said open mesh textile fabric for the plies in the tires herein described, the same is cut on the bias, for the purpose of additionally increasing the flexibility of the structure.

While the ring 11 has been herein mentioned as an element used together with other elements, such, for instance, as the plies of rubber or the plies of fabric or the valve, nevertheless it should be clearly understood that after vulcanization of the tire or tube the whole constitutes an integral mass in which the individual elements, such, for instance, as the said plies of rubber and the ring and the said plies of fabric, and the said valve, are fused together and constitute a single unitary article. It should also be understood that, while, for purposes of convenience and in order to give an example of one form of this invention, the ring 11 has been described as being an element used while the tire or tube is in the making, nevertheless the same may be omitted entirely and the other building elements united and vulcanized into a unitary whole.

I hereby reserve the benefit of all changes in form, arrangement, order, or use of parts, as it is evident that many minor changes may be made therein without departing from the spirit of this invention.

The flange 23ᵃ may be of the form shown in Fig. 11 instead of that shown in Figs. 1 and 2 and that shown in Fig. 4. In the form shown in Fig. 11, the shoulder 19 is omitted, and either the skill of the workman or a mark or series of marks are depended on instead of shoulder 19 to denote the stop for the innermost ply of material. Similar marks or skill may be relied upon to demark the place where the edges of the outer plies of material shall be brought. A countersink 49 in the internal periphery of the core 14ᵃ is adapted to receive the head 6 of valve 5 and there to be held in place by the innermost ply 17 of plastic material until the other plies 20 and 24 of plastic material are added and during the building of the tube or tire on the mandrel. By thus embedding the valve in the material of the tube or tire while the same is being built up on the mandrel, the same is found in place when the extreme opposite ends of the various plies of material are caused to meet or to overlap after removal of the partially completed article from the mandrel, and the said valve can then in an airtight manner be vulcanized into connection with, and in place in, the tube or tire 10 or tire 48 in the operation of curing the same. The foregoing remarks apply more especially to the formation of the construction shown in Figs. 11 and 12, but apply, also, where a ring 11 is used, as shown in Figs. 1, 2, etc.

In the practice of the method of forming tires or tubes from which the ring 11 is omitted, the following is the preferable mode of procedure. The head 6 of the valve 5 bearing a rubber gasket 50 and a gasket of rubberized fabric 51 upon the stem of the valve 5 is inserted in the countersink 49 in the core 14ᵃ, and the innermost ply 17 of plastic material is caused to fit around the said valve-stem either by the said stem being passed through a hole punched or cut in the said plastic ply or in any other suitable manner, and the said ply is then wrapped around core 14 and laid out upon flange 23 more or less as shown in Fig. 11. Of course, if the core such as core 13 shown in Fig. 4 is used, the said core 13 will need to be provided with a countersink 49, and slight changes of manipulation of the plies will be necessary. The same remarks apply to the cores 14 shown in Figs. 1 and 2. Next the plies of fabric 15 and plastic material 20 and 24 are arranged in alternation in substantially the manner illustrated in Fig. 11 and following the general method hereinbefore described. The article is then removed from the mandrel and the ends of the said plastic plies illustrated in Fig. 11 as lying upon flange 23ᵃ are caused to meet and partially underlap their opposite edges shown in Fig. 11 as extending beyond valve 5 toward notch 18 and caused to adhere to the said opposite edges. Their overlapping and underlapping relation is illustrated in Fig. 12, as is, also, the fact that the completed article is of substantially the shape of the interior contour of an ordinary outer casing for automobile tires. The size of the mandrel determines the size of the product, and thus both size and shape may be made approximately that of the interior of such a casing.

The relation of the fabric strips and plastic plies illustrated in section in Fig. 12 shows that while the discontinuance of the innermost fabric strips 15 some distance from the part of the construction that is adjacent to the felly of the wheel allows the expansion of the tube or tire with relatively a small amount of air-pressure as compared with present practice, yet the extension of the outer fabric strip to a point approximating the said felly part of the tire or tube carries the same below the point 35 of rim-cutting, and thus strengthens the article against blow-outs on account of rim-cutting. The overlapping of the plies of plastic material at the point adjacent to the felly portion of the tube or tire, together with the extension of the fabric to approximately the same point, produces an excess of material at or about that point which results in a stiffened bead or rib or thickened part thereat which forms a relatively strong, and yet pliable, part for contact with the felly of the wheel, which stiffened part takes the place of the ring 11 to which reference has been hereinbefore made, and which, like it, is after vulcanization an integral part of the tube or tire.

When, by overlapping the plies of material beneath the core 14 shown in Fig. 11 with those lying upon the flange 23 shown in the same figure, a structure like that illustrated in Fig. 12 has been produced, a gasket of rubberized material 52 is passed down the stem of valve 5 until it contacts with the outermost ply of plastic material 24, a keeper-plate 53 having the collar 54 thereon is similarly passed down the said valve stem, and the nut 55 is screwed home, all the said last-mentioned parts occupying the position shown in Fig. 13. The tube or tire is then introduced into mold 12 and inflated with air or other fluid, as hereinbefore described, and heat is applied to the same while in the said mold. The force of the fluid pressure upon the parts illustrated in Fig. 13 while in the said mold is such as to cause them to assume the form and position illustrated in Fig. 14, which figure illustrates the appearance of the finished article in side elevation, while Fig. 12 shows the same in cross-section. The gaskets 51 and 52 of rubberized fabric are used to prevent too great flow of the rubber over such metal parts as the valve-stem and the keeper-plate 53 under the influence of heat while the tube or tire is being cured. The rubber gasket 50, as well as the rubber in the gaskets 51 and 52, is for the purpose of producing an absolutely air-tight joint between the valve and the tube or tire. The convenience of this method of construction in eliminating useless operations, as well as the fact that no transverse seam needs vulcanization as in ordinary tube-making, and that no separate operation is necessary to vulcanize the valve in place, but that the same is vulcanized in its place in the same operation by which the tire or tube is cured, and, furthermore, that the product is seamless circumferentially as well as transversely, will be readily appreciated.

The fact that the product when made and used as an inner tube for a tire casing is of approximately the size and shape of the interior contour of such casing is a great advantage, as less air-pressure is necessary for proper distention of such a tube, while at the same time it is unnecessary to stretch the tube from a natural cylindrical form into something like the form of a wedge in order to cause the same to conform to the interior shape of the outer casing.

The wedge shape or shape somewhat like a section taken through the middle of a pear shown in Fig. 12 is imparted by the air or other fluid pressure within the tube or tire while being cured and by the form of the mold.

In practice it has been found desirable to work the opposing edges of the tire or tube very thoroughly together when the same has been removed from the mandrel as hereinbefore described, for the purpose of eliminating air-bubbles that would otherwise be retained in the plastic rubber; but this working has been attended by some inconvenience due to the adhesive quality of the entire tube or tire. To cause the edges to adhere and to work them firmly together, while at the same time not producing adhesion of other parts of the wall of the tire or tube, has necessitated the use of various expedients, all more or less unsatisfactory. By preference, therefore, talcum powder, soapstone, flour, or some similar dusty or powdery substance is spread within the tire or tube so as to cover all, or substantially all, of its interior wall (care being taken that the edges that are to overlap and adhere to each other are kept free from such material) and in that way adhesion of the opposite parts of the interior wall is prevented, while at the same time the overlapping and pressing down and working of the meeting opposing edges can be very conveniently performed upon the rest of the tube or tire.

I claim:

1. The method of making tires comprising placing a ply of plastic vulcanizable material upon a suitable core and working the same into circumferential endlessness and allowing the opposite edges thereof to remain unjoined, inserting a ring of relatively hard vulcanizable material within the partially tubular construction thus formed by the said ply, repeating the operation hereinbefore mentioned in connection with said first-mentioned vulcanizable plastic ply for another plastic ply or as many plastic plies as desired, removing the tire from said core, inserting the valve, closing the opposite edges of the said plastic plies, and curing the said tire and vulcanizing all its members into an integral mass and the valve into its place therein by baking the same in a suitable oven.

2. The method of forming a tire consisting in laying upon a suitable core a ply of plastic vulcanizable material that almost completely encircles the said core and working the same thereon so as to give it proper thickness and dimension and which is endless and seamless circumferentially of the said core; placing within the said core and in adhesive connection with the said first-mentioned plastic ply a ring of relatively harder vulcanizable material and having therein a hole for the passage of a valve therethrough; superimposing upon the said ply of plastic material adjacent to the tread portion of the tire a ply of protective material and working the same into adhesive connection with the said first-mentioned ply (the said protective ply extending circumferentially around the said first-mentioned ply, but not extending so far around the said core as the said first-mentioned ply); superimposing another ply of vulcanizable plastic material which more or less underlies the said ring and is caused to adhere thereto and which is circumferentially endless and seamless and nearly encircles the said core and working the same into adhesive connection with the said ply of protective material and so working the same to proper thickness and dimension; removing the tire from the core and bringing its loose or flap ends over into juxtaposition to the said first-mentioned ply and causing the ends of the innermost or first-mentioned ply to meet and adhere to each other and the end of the second plastic ply (and, if there be any, of any other plastic plies) underneath the said ring and causing the same to adhere thereto (the valve having been previously inserted in the said hole in the said ring); and vulcanizing the whole into an intergral mass.

3. The herein-described method of making a tire consisting in forming upon a suitable core a layer or ply of plastic rubber the opposite edges of which do not meet while on said core; forming in like manner in superimposed position and adhesive connection an additional layer or additional layers of plastic rubber having edges that do not meet while on the said core; removing the tire from the said core; causing the said opposing edges to approach each other; inserting a semi-hard rubber ring or the like having a valve protruding therethrough between the said opposing edges; causing the said opposing edges to adhere to each other and to the said ring and valve; and vulcanizing the said valve into place and the said opposing edges into integral union with each other and the body of the said tire for its curing in a single operation of baking.

4. The method of forming a tire consisting in laying upon a suitable core a ply of vulcanizable plastic material that almost completely encircles the said core and working the same thereon so as to give it proper thickness and dimension and which is endless and seamless circumferentially of the said core; placing within the said core and in adhesive connection with the said first-mentioned plastic ply a ring of relatively harder vulcanizable material and having therein a hole for the passage of a valve therethrough; superimposing upon the said ply of plastic material adjacent to the tread portion of the tire a ply of protective material and working the same into adhesive connection with the said first-mentioned ply (the said protective ply extending circumferentially around the said first-mentioned ply;) superimposing another ply of vulcanizable plastic material which more or less underlies the said ring and is caused to adhere thereto and which is circumferentially endless and seamless and nearly encircles the said core and working the same into adhesive connection with the said ply of protective material and so working the same to proper thickness and dimension; removing the tire from the core and bringing its loose or flap ends over into juxtaposition to the said first-mentioned ply and to the said ring and causing the ends of the innermost or first-mentioned ply to meet and adhere to each other and the end of the second plastic ply (and, if there be any, of any other plastic plies) underneath the said ring and causing the same to adhere thereto (the valve having been previously inserted in the said hole in the said ring); and vulcanizing the whole into an integral mass.

5. The method of forming a tire consisting in laying upon a suitable core a ply of vulcanizable plastic material that almost completely encircles the said core and working the same thereon so as to give it proper thickness and dimension and which is endless and seamless circumferentially of the said core; placing within the said core and in adhesive connection with the said first-mentioned plastic ply a ring of relatively harder vulcanizable material and having therein a hole for the passage of a valve therethrough; superimposing upon the said ply of plastic material adjacent to the tread portion of the tire a ply of protective material and working the same into adhesive connection with the said first-mentioned ply (the said protective ply extending circumferentially around the said first-mentioned ply); superimposing another ply of vulcanizable plastic material which underlies and extends beyond the middle of the said ring; and is caused to adhere thereto and which is circumferentially endless and seamless and nearly encircles the said core and working the same into adhesive connection with the said ply of protective material and so working the same to proper thickness and dimension; removing the tire from the core and bringing its loose or flap ends over into juxtaposition to the said first-mentioned ply and to the said ring and causing the ends of the innermost or first-mentioned ply to meet and adhere to each other and the end of the second plastic ply (and, if there be any, of any other plastic plies) underneath the said ring and beyond its middle and causing the same to adhere thereto (the valve having been previously inserted in the said hole in the said ring); and vulcanizing the whole into an integral mass.

6. The method of forming a tire consisting in laying upon a suitable core a ply of plastic vulcanizable material that almost completely encircles the said core and which is endless and seamless circumferentially of the said core and working the same thereon so as to give it the proper thickness and dimension, superimposing upon the said ply of plastic material a ply of protective material and working the same into adhesive connection with said first-mentioned ply, the said protective ply extending circumferentially around the first-mentioned ply, but not extending so far around the said core as the first-mentioned ply, superimposing another ply of vulcanizable material which is circumferentially endless and seamless and nearly encircles the said core and working the same into adhesive connection with said ply of protective material and said first-mentioned ply, removing the tire from said core, and causing the ends of the innermost or first-mentioned ply to meet and adhere to each other, and causing the ends of exterior successive plies of vulcanizable material to meet and adhere to each other, and vulcanizing the whole into an integral mass.

7. The method of forming a tire consisting in laying upon a suitable core a ply of plastic vulcanizable material that almost completely encircles the said core and which is endless and seamless circumferentially of the said core and working the same thereon so as to give it proper thickness and dimension; placing within the said core and in adhesive connection with the said first-mentioned plastic ply a ring of vulcanizable material and having therein a hole for the passage of a valve therethrough; superimposing upon the said ply of plastic material adjacent to the tread portion of the tire a ply of protective material and working the same into adhesive connection with the said first-mentioned ply (the said protective ply extending circumferentially around the said first-mentioned ply, but not extending so far around the said core as the first-mentioned ply); superimposing another ply of vulcanizable plastic material which more or less underlies the said ring and is caused to adhere thereto and which is circumferentially endless and seamless and nearly encircles the said core and working the same into adhesive connection with the said ply of protective material and so working the same to proper thickness and dimension; removing the tire from the core and bringing its loose or flap ends over into juxtaposition to the said first-mentioned ply and to the said ring and causing the ends of the innermost or first-mentioned ply to meet and adhere to each other and the end of the second plastic ply (and, if there be any, of any other plastic plies) underneath the said ring and causing the same to adhere thereto (the valve having been previously inserted in the said hole in the said ring); and vulcanizing the whole into an integral mass.

In testimony whereof I hereunto affix my signature.

HARRY B. WALLACE.